United States Patent
Picinich et al.

(10) Patent No.: US 8,856,793 B2
(45) Date of Patent: Oct. 7, 2014

(54) SYSTEM, METHOD AND PROGRAM FOR SCHEDULING COMPUTER PROGRAM JOBS

(75) Inventors: Joseph M. Picinich, Peoria, AZ (US); Loren W. Pusey, Dublin, OH (US); Jiyu C. Lin, Erie, CO (US)

(73) Assignee: International Business Machines Corporation, Armonk, NY (US)

( * ) Notice: Subject to any disclaimer, the term of this patent is extended or adjusted under 35 U.S.C. 154(b) by 2265 days.

(21) Appl. No.: 10/843,932

(22) Filed: May 11, 2004

(65) Prior Publication Data

US 2005/0268299 A1 Dec. 1, 2005

(51) Int. Cl.
*G06F 9/46* (2006.01)
*G06F 9/48* (2006.01)

(52) U.S. Cl.
CPC .................................. *G06F 9/485* (2013.01)
USPC ....................................................... 718/102

(58) Field of Classification Search
USPC .............. 718/1, 100, 101, 102, 103, 104, 105
See application file for complete search history.

(56) References Cited

U.S. PATENT DOCUMENTS

| | | | | |
|---|---|---|---|---|
| 5,260,868 A * | 11/1993 | Gupta et al. | ................... | 700/100 |
| 5,270,920 A * | 12/1993 | Pearse et al. | ....................... | 705/8 |
| 5,303,369 A | 4/1994 | Borcherding et al. | ........ | 395/650 |
| 5,325,525 A | 6/1994 | Shan et al. | ..................... | 395/650 |
| 5,615,121 A * | 3/1997 | Babayev et al. | ................... | 705/9 |
| 5,671,361 A | 9/1997 | Brown et al. | ................. | 395/209 |
| 5,867,483 A * | 2/1999 | Ennis et al. | ................... | 370/252 |
| 5,875,464 A * | 2/1999 | Kirk | ............................... | 711/129 |
| 5,881,283 A * | 3/1999 | Hondou et al. | ............... | 718/100 |
| 6,041,354 A * | 3/2000 | Biliris et al. | ................... | 709/226 |
| 6,178,542 B1 * | 1/2001 | Dave | ............................... | 716/18 |
| 6,263,359 B1 * | 7/2001 | Fong et al. | ..................... | 718/103 |
| 6,353,844 B1 * | 3/2002 | Bitar et al. | ..................... | 718/102 |
| 6,385,638 B1 * | 5/2002 | Baker-Harvey | ............... | 718/107 |
| 6,411,982 B2 * | 6/2002 | Williams | ....................... | 718/102 |
| 6,418,356 B1 * | 7/2002 | Oh | ................................. | 700/217 |
| 6,418,459 B1 | 7/2002 | Gulick | ........................... | 709/104 |
| 6,574,587 B2 * | 6/2003 | Waclawski | ..................... | 702/186 |
| 6,640,230 B1 * | 10/2003 | Alexander et al. | ..................... | 1/1 |
| 6,671,593 B2 * | 12/2003 | Sinex | ............................... | 701/29 |
| 6,694,218 B2 * | 2/2004 | Oh | ................................. | 700/217 |
| 6,769,120 B1 * | 7/2004 | Rodriguez | ..................... | 718/100 |
| 6,850,966 B2 * | 2/2005 | Matsuura et al. | ............. | 709/203 |
| 6,948,171 B2 * | 9/2005 | Dan et al. | ....................... | 718/100 |
| 6,952,828 B2 * | 10/2005 | Greene | .......................... | 718/104 |
| 7,006,903 B2 * | 2/2006 | Smith et al. | ........................ | 701/3 |
| 7,020,619 B2 * | 3/2006 | Thompson | ......................... | 705/8 |
| 7,089,349 B2 * | 8/2006 | Chang et al. | .................. | 711/103 |

(Continued)

*Primary Examiner* — Abdullah Al Kawsar
(74) *Attorney, Agent, or Firm* — Schmeiser, Olsen & Watts, LLP; Arthur J. Samodovitz

(57) ABSTRACT

Scheduling a program for periodic execution. The program requires a computer resource for execution. The historic availability of the resource is determined and recorded at a multiplicity of times a day. Subsequently, a request is received to schedule a program for execution on the day at a specified time and daily thereafter at the specified time or weekly or monthly thereafter on the day at the specified time. If there has been sufficient historic availability of the resource on the day at approximately the specified time, the program is scheduled for execution on the day at the specified time and daily thereafter at the specified time or weekly or monthly thereafter on the day at the specified time as requested. If not, the program is scheduled for execution at another time on the specific day close to the specified time.

11 Claims, 4 Drawing Sheets

(56) References Cited

U.S. PATENT DOCUMENTS

| | | | |
|---|---|---|---|
| 7,298,501 B2* | 11/2007 | Christodoulou et al. | 358/1.12 |
| 7,457,762 B2* | 11/2008 | Wetzer et al. | 705/8 |
| 7,610,575 B2* | 10/2009 | Sproule | 717/103 |
| 7,689,995 B1* | 3/2010 | Francis et al. | 718/104 |
| 2002/0198923 A1* | 12/2002 | Hayes, Jr. | 709/102 |
| 2003/0149605 A1* | 8/2003 | Cragun et al. | 705/8 |
| 2004/0122722 A1* | 6/2004 | Quintus et al. | 705/8 |
| 2004/0122723 A1* | 6/2004 | Quintus et al. | 705/8 |
| 2004/0177353 A1* | 9/2004 | Rao | 717/171 |
| 2004/0205206 A1* | 10/2004 | Naik et al. | 709/230 |
| 2005/0015504 A1* | 1/2005 | Dorne et al. | 709/229 |
| 2005/0034126 A1* | 2/2005 | Moore | 718/100 |
| 2005/0081096 A1* | 4/2005 | Gold et al. | 714/13 |
| 2006/0100912 A1* | 5/2006 | Kumar et al. | 705/4 |
| 2007/0022425 A1* | 1/2007 | Jackson | 718/104 |
| 2007/0083416 A1* | 4/2007 | Podrazhansky | 705/9 |

* cited by examiner

SYSTEM, METHOD AND PROGRAM FOR SCHEDULING COMPUTER PROGRAM JOBS

BACKGROUND

The invention relates generally to computer systems, and deals more particularly with a technique to schedule computer program jobs for periodic execution.

Many types of computer program jobs are scheduled for periodic execution. These program job update databases, maintain databases (i.e. trim logs, purge old documents, etc.), backup data, perform other "batch jobs", and perform routine system or user maintenance. For example, a database backup program can be scheduled to execute at midnight every day, and a database maintenance program can be scheduled to execute at six o'clock PM every Sunday. Various computer resources such as processor(s), RAM, disk storage, and I/O (input/output) may be needed to execute the program. However, occasionally, the computer has many jobs to execute at one time, and there may be inadequate resources to execute them all promptly or effectively. A deficiency of even one resource can impede the execution of the job.

It was known to evaluate the availability of computer resources before beginning to execute a program job. If the availability is low, then the execution of the program job can be delayed until more resources become available. U.S. Pat. No. 6,578,005 discloses a technique to change an execution schedule when resources become unavailable. U.S. Pat. No. 6,418,459 discloses a technique to schedule tasks based on current resource availability. It was also known for an application to report its resource needs to a scheduler so the scheduler can determine if sufficient resources are currently available to execute the application.

An object of the present invention is to schedule computer program jobs or other types of applications for execution at a regular time when sufficient computer resources are likely to be available.

SUMMARY OF THE INVENTION

The invention resides in a system, method and program for scheduling a program for periodic execution. The program requires a computer resource for execution. The historic utilization or availability of the resource is determined and recorded at a multiplicity of times a day. Subsequently, a request is received to schedule a program for execution on the day at a specific time and daily thereafter at the specific time or weekly or monthly thereafter on the day at the specific time. In response, the record of the historic utilization or availability of the resource is checked for the day at approximately the specific time to determine if there has been sufficient availability or a predetermined minimum amount of availability of the resource in the past on the day at approximately the specific time. If so, the program is scheduled for execution on the day and specific time and daily thereafter at the specific time or weekly or monthly thereafter on the day at the specific time as requested. If not, the program is not scheduled for execution on the day at the specific time.

According to another feature of the present invention, if there was not sufficient availability or the predetermined minimum amount of availability of the resource in the past on the day and time, then another time on the day close to specific time is automatically determined when there was sufficient availability of the resource in the past to execute the program. Then, an operator is notified of the other time on the day. The operator indicates whether the other time on the day is acceptable. If so, the program is scheduled for execution at the other time on the day and daily thereafter at the other time or weekly or monthly thereafter on the day at the other time.

According to another feature of the present invention, the request is to schedule a program for execution during a time window of a specific day. In response, the record of the historic utilization or availability of the resource for the time window on the day is checked to determine if there has been sufficient availability or a predetermined minimum amount of availability of the resource in the past during the time window on the day. If so, the program is scheduled for execution at a time within the time window on the day when there was sufficient availability or a predetermined minimum amount of availability of the resource in the past and daily thereafter at the time or weekly or monthly thereafter on the day at the time as requested. If not, the program is not scheduled for execution during the time window.

DETAILED DESCRIPTION OF THE PREFERRED EMBODIMENTS

Figure 1:
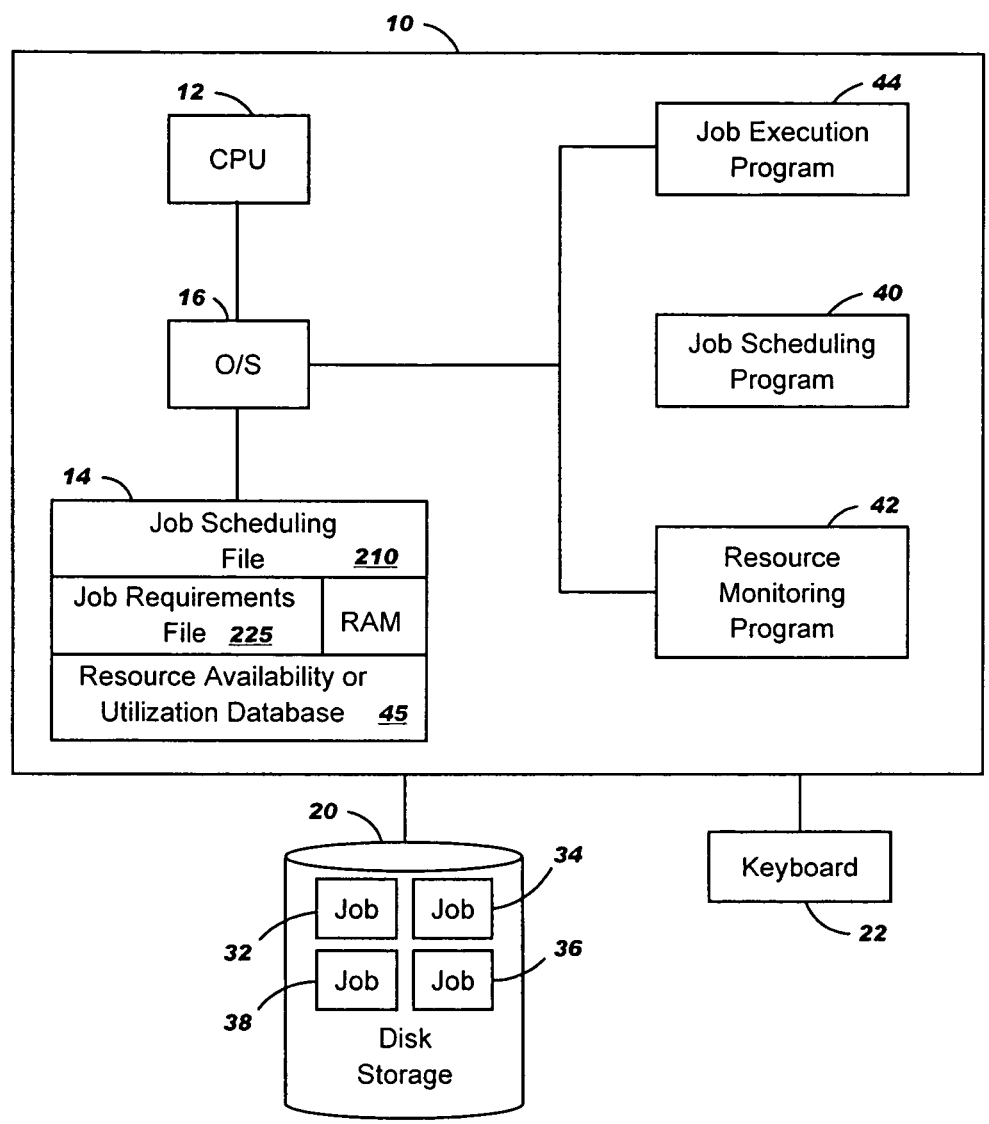
FIG. 1 is a block diagram of a computer system in which the present invention is incorporated.

The present invention will now be described in detail with reference to the figures. FIG. 1 illustrates a computer system generally designated 10 in which the present invention is installed and executed. Computer system 10 comprises a processor 12, a RAM 14, an operating system 16, disk storage 20 and a keyboard 22 through which an administrator can schedule program jobs for periodic execution as described below. Multiple job programs 32, 34, 36 and 38 are stored in disk storage 20. Computer system 10 also comprises a job scheduling program 40 which schedules each of the job programs 32,34,36 and 38 for periodic execution. For example, job program 32 is scheduled for execution at midnight every Monday, job program 34 is scheduled for execution every day at 5 PM and job program 36 is scheduled for execution every Wednesday at noon. Job 38 is yet to be scheduled. Computer system 10 also comprises a resource monitoring program 42 monitors availability of computer resources at every unit of time, for example, every minute of every day. These computer resource comprise the CPU 12, RAM 14, and storage 20, but could include other computer resources as well. Computer resource monitoring program 42 then averages and records the "historic" resource utilization or availability at every unit of time. The resource monitoring program 42 is further described below with reference to FIG. 2. Resource availability/utilization tends to follow time patterns. This is because certain times of day are busier than others due to normal work schedules, user demand, and system maintenance activities. Also, many existing program jobs are scheduled for periodic execution at common times. Computer system 10 also includes a job execution program 44 which attempts to execute jobs when scheduled. Programs 40, 42 and 44 are stored on computer readable storage 20 for execution by CPU 12 via computer readable RAM 14.

When a user or application requests to schedule a new program job for periodic execution, the request may specify a desired regular time and day for execution or a desired time window on the day for execution. In such a case, job scheduling program 40 predicts, based on the historic average resource availability records, whether sufficient resources will likely be available in the future at the desired time and day. If not, job scheduling program 40 will notify the requester, and identify an alternate time, near to the desired time when sufficient resources are likely to be available (based on the historic availability records). The requestor can then accept or reject this alternate, regular time for execution. Thus, job scheduling program 40 recommends or selects the regular day and time for execution of each of the new program job such as job 38 when it is expected that there are sufficient resources available to promptly and effectively execute the program job. This is further described below with reference to FIG. 3.

Meanwhile, a job execution program 44 is running. When the time comes for execution of a scheduled job, the job execution program 44 determines if there are sufficient resources available to execute the scheduled job. If so, the job execution program 44 notifies the operating system to execute the job. If not, the job execution program 44 determines another time to execute the job when it is likely, based on historical availability or utilization data, that there will be sufficient resources to execute the job. This is further described below with reference to FIG. 4.

Figure 2:
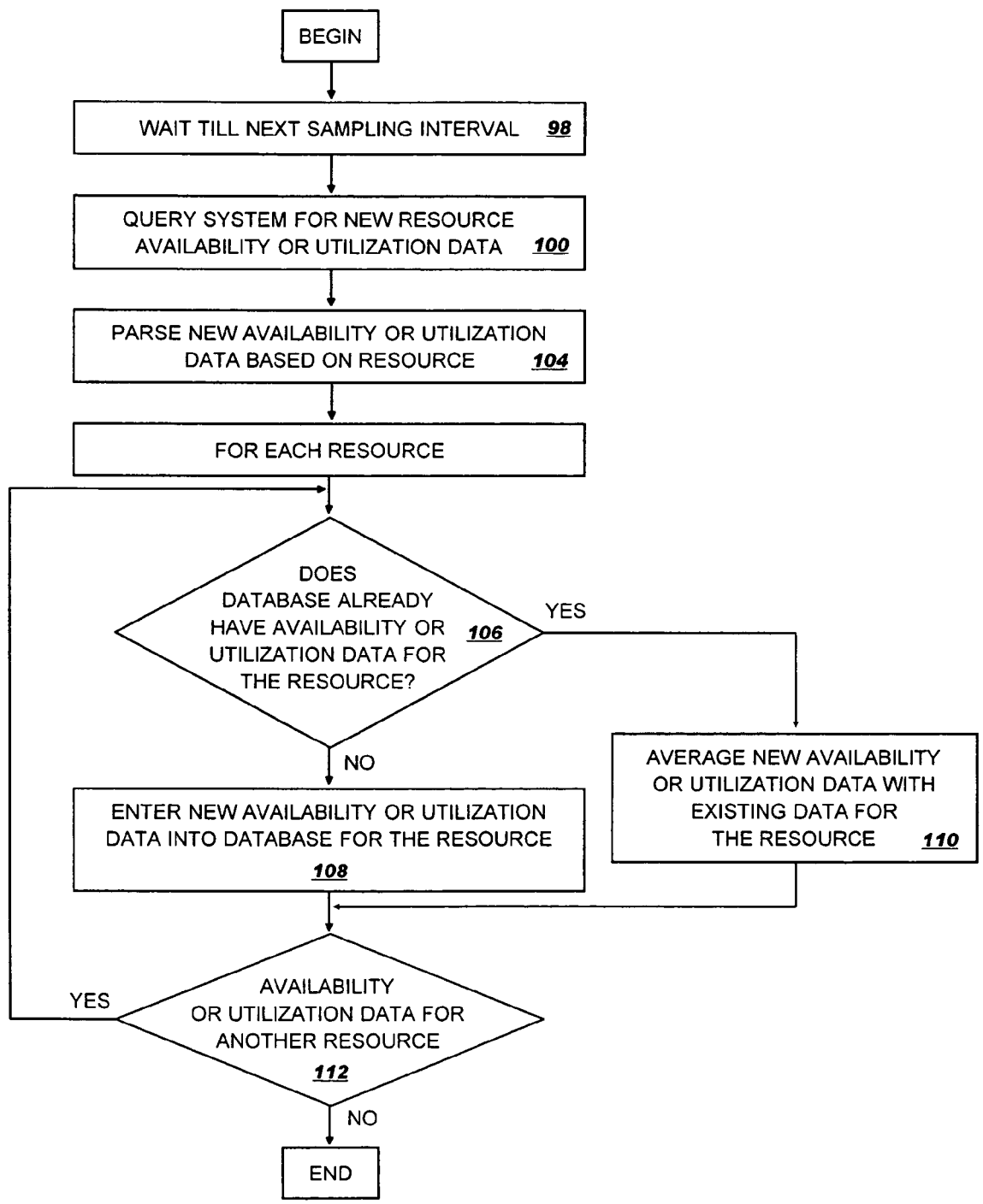
FIG. 2 is a flow chart illustrating a computer resource monitoring program according to the present invention.

FIG. 2 illustrates in more detail the resource monitoring program 42 which gathers and averages the historic data of resource availability. Resource monitoring program 40 periodically (for example, every five minutes or preferably, every minute or less) queries the operating system for availability or utilization data for the processor 12, RAM 14 and storage 20 (steps 98 and 100). The system availability or utilization data is generated by known hardware and microcode functions. For example, Unix, Windows NT and IBM zSeries systems all include such hardware and microcode. The hardware and microcode within a zSeries system is further described in U.S. patent application entitled "System and Method to Monitor Amount of Usage of Applications in Logical Partitions" Ser. No. 10/613,779 filed Jul. 1, 2003 by Mathias, et al., which patent application is hereby incorporated by reference into the present disclosure. In the Unix system, the resource monitoring program obtains this availability or utilization data by calling a known vmstat function. In the Windows system, this availability or utilization data is obtained by calling a Performance Monitor function. In the z/OS operating system, the resource monitoring program 42 obtains this availability or utilization data by calling a known RMF function. There are similar functions in other operating systems which will obtain the availability or utilization data. If there is new availability or utilization data, then resource monitoring program 40 parses the data to separate out the availability or utilization data for each computer resource of interest (step 104). Then, for each resource of interest, resource monitoring program 40 performs the following steps 106-110 with the respective availability or utilization data. If this is the first availability or utilization data for resources of interest for the current time unit, for example, the 1:15 PM to 1:16 PM on Monday time unit, (decision 106, no branch), then the resource monitoring program enters a new record for this resource into an availability or utilization database 45 specifying the resource availability, day and time (step 108). The resource availability or utilization may be expressed as a percentage of total resources available such as 10% of the CPU, and 15% of the RAM and 20% of the storage. Alternately, the resource availability or utilization may be expressed as an absolute amount of resources available or used such as ten MIPs of CPU, five megabytes of RAM or one hundred gigabytes of storage. (For purposes of the present invention, if the data obtained from the system hardware and microcode indicates resource utilization, then the resource monitoring function 42, job scheduling program 40 and job execution program 44 can subtract the utilization amount for each resource from the respective total system resources to determine the availability of each resource.) Referring again to decision 106, yes branch, if there was prior availability or utilization data for computer resource for the current time unit, then resource monitoring program 40 averages the current availability or utilization data for this time unit with the prior availability or utilization data for this time unit for the resource, and updates the corresponding record (step 110). The average availability or utilization data computed in step 110 will only reflect the last month's (or other relevant period's) availability or utilization data; older data is purged before the averaging occurs in step 110. If there is availability or utilization data for another of the resources yet to be processed in steps 106-111 (decision 112, yes branch), then resource monitoring program 40 loops back to step 104. Otherwise, resource monitoring program waits for the next time unit to occur (step 98), to proceed to step 100 where it queries the operating system for availability or utilization data.

Figure 3:
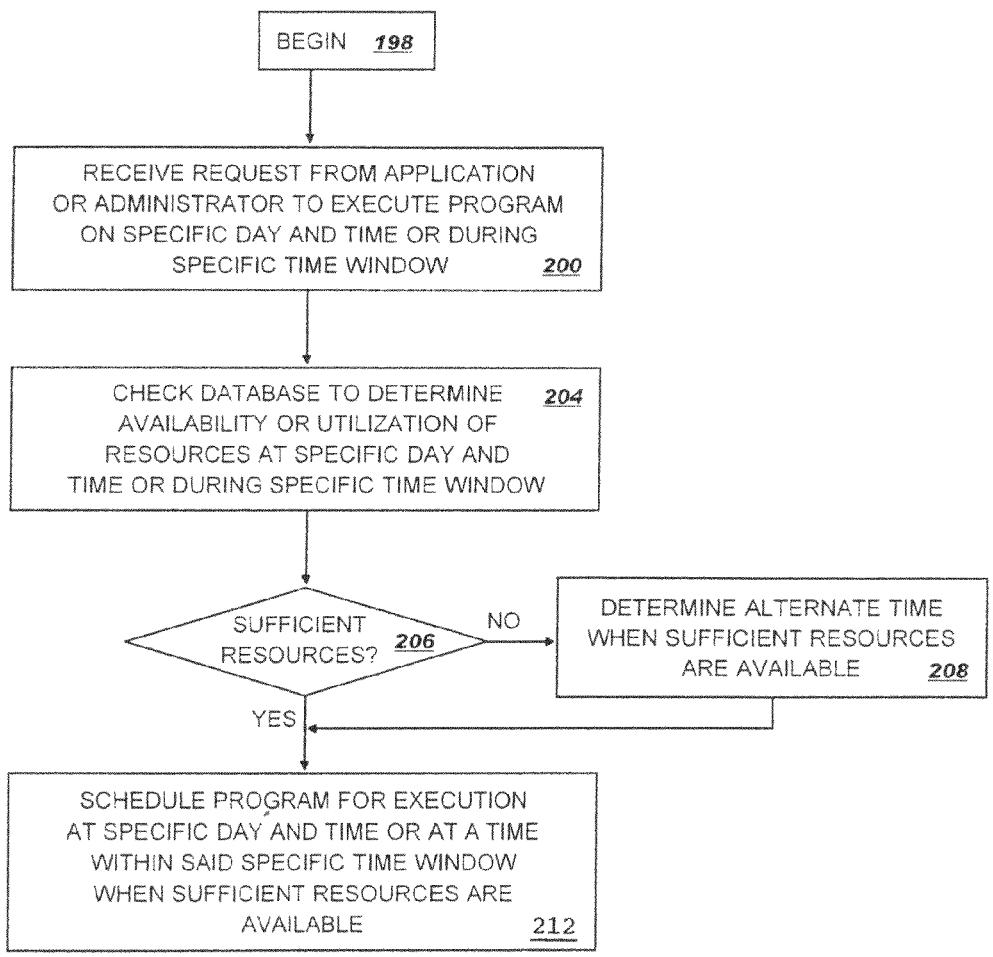
FIG. 3 is a flow chart illustrating a job scheduling program according to the present invention.

FIG. 3 illustrates the operation of job scheduling program 40 in more detail. After invoking job scheduling program 40 (step 198), an application or an administrator using a computer keyboard or mouse requests a specific, regular time and day to schedule the program job 38 for execution, such as every Monday at midnight, every day at 5 PM, the first Monday of every month at 5 PM or the tenth of every month at 5 PM (step 200). The application or administrator can also specify the minimum availability of each type of resource required or recommended for the program job. In the absence of such a specification, default values will apply, where the default values are general guidelines for executing program jobs. The minimum availability levels are stored in a program job requirements file 225. Then, job scheduling program 40 reads the historic resource availability records from the availability or utilization data base 45 to determine if the minimum threshold of resources of each type has been available at the requested day and time unit (step 204). In the foregoing examples, this would be the Monday 12:00 AM to 12:01 AM time unit, the every day 5:00 PM to 5:01 PM time unit, the first Monday every month 6:00 PM to 6:01 PM time unit or the tenth of every month 5:00 PM to 5:01 PM time unit. If the minimum threshold of availability of each resource has not been met on average in the past month during this time unit (decision 206, no branch), then job scheduling program 40 identifies alternate, periodic time slots to execute the program job (step 208). Job scheduling program 40 identifies the alternate time slots based on what time unit within one hour (or other relevant time period) of the requested time or time window has had the most resource availability on the average during the last month. The job scheduling program obtains this information from the resource availability records from the availability or utilization data base 45. Referring again to decision 206, yes branch, where the historic, average availability of resources is equal to or greater than the respective thresholds for all the resources of interest during the specified day and time, job scheduling program 40 schedules the program job by making an entry in a job scheduling file 210; the entry includes the name of the program job and regular day and time for execution (step 212).

In another embodiment of the present invention, the application or administrator requests that the program job 38 be scheduled for execution within a specified time window of a day, for example between 5 PM and 6 PM every Monday (or between 5 PM and 6 PM daily or between 5 PM and 6 PM every tenth of every month). In this other embodiment, in step 204, the job scheduling program reads the availability or utilization database 45 to identify a specific time unit within the window when there are the predetermined minimum amount of resources available. For example, it may be the case that between 5:10 PM and 5:11 PM there are sufficient resources to execute the program job, and this time unit can be scheduled. Alternately, job scheduling program 44 reads the availability or utilization database 45 to identify the specific time within the window when there is the most availability of the resources, and the availability exceeds the minimum thresholds. In this alternate embodiment of the present invention, that will be the time when the program job is scheduled for execution.

Figure 4:
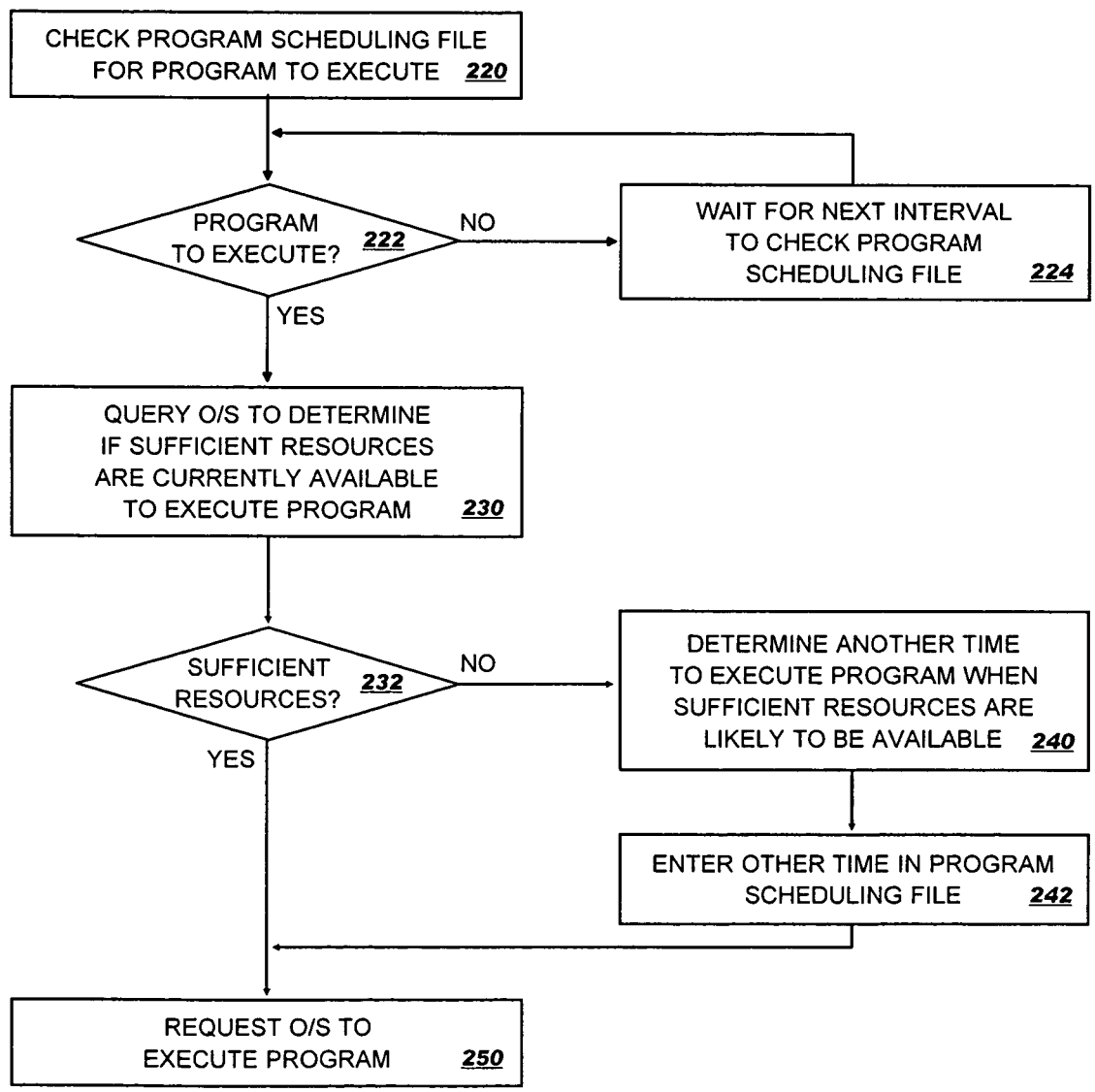
FIG. 4 is a flow chart illustrating a job execution program according to the present invention.

FIG. 4 illustrates ongoing operation of job execution program 40 to initiate execution of scheduled jobs. Job execution program 40 periodically (for example, every second) reads the job scheduling file 210 (step 220) to determine if the time has arrived to execute any program jobs (decision 222). If not, then the job execution program 40 waits for the next time period to check the job scheduling file again (step 224). However, if there is a program job scheduled for execution at the current time, then job execution program 40 determines if there are sufficient computer resources currently available to execute the job. If this is the first time that the program job will be executed, then there is no historical data on how much computer resources of each type are used to execute the program job. So, in this case, the job execution program 40 determines if the current availability of all of the computer resources equals or exceeds the respective minimum specified by the requestor in step 200 or the default values, in absence of such a specification. If sufficient resources of all types are currently available (decision 230, yes branch), then the job execution program 40 notifies the operating system to execute the program job. If not, then the job execution program 40 determines when, during the next hour (or other relevant time period) that sufficient computer resources are likely to be available (step 240). In another embodiment of the present invention, the job execution program searches for the best time within the next hour to execute this job. The "best" time is the time when the resource availability is expected to be the highest, and is expected to exceed the minimum thresholds. Both determinations are based on the historical availability records within the availability or utilization data base 45. In still another embodiment of the present invention, if sufficient resources are not currently available to execute the job (decision 230, no branch), job execution program 40 reschedules/delays planned execution of the job by a predetermined amount, for example five minutes (step 240). This delay amount can be preprogrammed into job execution program or specified by the "owner/requestor" of the job. In either case, when it is time to execute the rescheduled job, the job execution program 44 will repeat decisions 222 and 230 to determine if there are sufficient resources available then. If not, then the planned execution is delayed another five minutes or until another optimum execution time as determined from the historical availability records.

During the first execution of each program job, the job execution program 40 monitors the amount of utilization of each resource, and stores the utilization data in the program job requirements file 225 replacing the specification made by the requestor in step 200 or the default values in the absence of the specification. This monitoring is performed by a query to the Performance Monitor function in the case of the Windows operating system, the vmstat function in the case of the Unix operating system, or the RMF function in the case of the z/OS operating system. All of these functions will return the utilization of each resource caused by the job. For subsequent executions of this same program job, to determine if there are sufficient resources available in decision 230, the job execution program will query the Performance Monitor function in the case of the Windows operating system, the vmstat function in the case of the Unix operating system or the RMF function in the case of the z/OS operating system to determine the current availability of each resource. Then, the job execution program will compare the utilization requirements data for the job (from the program job requirements file 225) to the current availability. If the current availability of all the resources is greater than requirements of all the respective resources for the job, then the job execution program 44 will request that the operating system execute the job.

Based on the foregoing, a system, method and program for scheduling jobs for periodic execution have been disclosed. However, numerous modifications and substitutions can be made without deviating from the scope of the present invention. Therefore, the present invention has been disclosed by way of example and not limitation, and reference should be made to the following claims to determine the scope of the present invention.

The invention claimed is:

1. A method for scheduling a program for periodic execution, said program requiring a computer hardware resource for execution, said method comprising the steps of:
   a computer determining and recording historic utilization or availability of said computer hardware resource at a multiplicity of times a day; and
   the computer subsequently receiving a request to schedule a program for execution on said day at a specified time and (a) daily thereafter at said specified time or (b) weekly thereafter on said day of the week at said specified time, or (c) monthly thereafter on said day of the month at said specified time, and in response, the request receiving computer checking the record of the historic utilization or availability of said computer hardware resource for said day at approximately said specified time to determine if there has been sufficient historical availability of said resource on said day at approximately said specified time to execute said program, and if so, scheduling said program for execution on said day at said specified time and (i) daily thereafter at said specified time, or (ii) weekly thereafter on said day of the week at said specified time, or (iii) monthly thereafter on said day of the month at said specified time, as requested, and if not, the request receiving computer not scheduling said program for execution on said day at said specified time or (i) daily thereafter at said specified time, or (ii) weekly thereafter on said day of the week at said specified time, or (iii) monthly thereafter on said day of the month at said specified time, as requested,
   wherein there was not sufficient historical availability of said computer hardware resource on said day at approximately said specified time, and in response, the request receiving computer automatically determining another time on said day within an hour of said specified time at which there was sufficient historical availability of said resource in the past to execute said program and displaying on a computer monitor a notification that said other time on said day is available to execute said program.

2. The method set forth in claim 1 wherein said computer hardware resource is one of a processor, a computer readable storage device and a random access memory.

3. The method set forth in claim 1 wherein the step of the determining and recording computer determining and recording historic utilization or availability of said computer hardware resource at a multiplicity of times a day comprises the step of the determining and recording computer determining and recording utilization or availability of said computer hardware resource every minute or less of said day.

4. The method set forth in claim 1 wherein the step of the determining and recording computer determining and recording historic utilization or availability of said computer hardware resource at a multiplicity of times a day comprises the step of determining and recording utilization or availability of said computer hardware resource every minute or less of every day of a week.

5. The method set forth in claim 1 wherein the step of the request receiving computer determining if there was sufficient historical availability of said computer hardware resource on said day at approximately said specified time, comprises the step of the request receiving computer comparing a requirement of said program for said computer hardware resource during execution of said program to the historic availability of said computer hardware resource on said day at approximately said specified time.

6. A computer program product for scheduling a program for periodic execution, said program requiring a computer hardware resource for execution, said computer program product comprising:

a computer readable non-transitory storage media;

first program instructions to determine and record historic utilization or availability of said computer hardware resource at a multiplicity of times a day; and second program instructions to subsequently receive a request to schedule a program for execution on said day at a specified time and (a) daily thereafter at said specified time or (b) weekly thereafter on said day of the week at said specified time, or (c) monthly thereafter on said day of the month at said specified time, and in response, check the record of the historic utilization or availability of said computer hardware resource for said day at approximately said specified time to determine if there has been sufficient historical availability of said resource on said day at approximately said specified time to execute said program, and if so, schedule said program for execution on said day at said specified time and (i) daily thereafter at said specified time, or (ii) weekly thereafter on said day of the week at said specified time, or (iii) monthly thereafter on said day of the month at said specified time, as requested, and if not, not schedule said program for execution on said day at said specified time or (i) daily thereafter at said specified time, or (ii) weekly thereafter on said day of the week at said specified time, or (iii) monthly thereafter on said day of the month at said specified time, as requested;

third program instructions, in response to there not being sufficient historical availability of said computer hardware resource on said day at approximately said specified time, for determining another time on said day within an hour of said specified time at which there was sufficient historical availability of said resource in the past to execute said program and displaying on a computer monitor a notification that said other time on said day is available to execute said program, and wherein said first, second and third program instructions are stored on said computer readable storage media.

7. The computer program product set forth in claim 6 wherein said computer hardware resource is one or more processors.

8. The computer program product set forth in claim 6 wherein said computer hardware resource is a computer readable storage device.

9. The computer program product set forth in claim 6 wherein said computer hardware resource is RAM.

10. A computer system for scheduling a program for periodic execution, said program requiring a computer hardware resource for execution, said computer system comprising:

a CPU, a computer readable memory, and a computer readable storage media;

first program instructions to determine and record historic utilization or availability of said computer hardware resource at a multiplicity of times a day; and second program instructions to subsequently receive a request to schedule a program for execution on said day at a specified time and (a) daily thereafter at said specified time or (b) weekly thereafter on said day of the week at said specified time, or (c) monthly thereafter on said day of the month at said specified time, and in response, check the record of the historic utilization or availability of said computer hardware resource for said day at approximately said specified time to determine if there has been sufficient historical availability of said resource on said day at approximately said specified time to execute said program, and if so, schedule said program for execution on said day at said specified time and (i) daily thereafter at said specified time, or (ii) weekly thereafter on said day of the week at said specified time, or (iii) monthly thereafter on said day of the month at said specified time, as requested, and if not, not schedule said program for execution on said day at said specified time or (i) daily thereafter at said specified time, or (ii) weekly thereafter on said day of the week at said specified time, or (iii) monthly thereafter on said day of the month at said specified time, as requested;

third program instruction, in response to there not being sufficient historical availability of said computer hardware resource on said day at approximately said specified time, for determining another time on said day within an hour of said specified time at which there was sufficient historical availability of said resource in the past to execute said program and displaying on a computer monitor a notification that said other time on said day is available to execute said program, and wherein said first, second and third program instructions are stored on said computer readable storage media for execution by said CPU via said computer readable memory.

11. The computer program product set forth in claim 10 wherein said computer hardware resource is one of a processor, a computer readable storage device and a random access memory.

* * * * *